United States Patent
Berg et al.

(10) Patent No.: US 6,671,130 B2
(45) Date of Patent: Dec. 30, 2003

(54) APPARATUS FOR SUPPORTING A RECORDING/READING HEAD AND ASSEMBLING A FLEX CIRCUIT IN A DISC DRIVE

(75) Inventors: Lowell James Berg, Eden Prairie, MN (US); Harlan Jon Kragt, Maple Grove, MN (US)

(73) Assignee: Seagate Technology LLC, Scotts Valley, CA (US)

(*) Notice: Subject to any disclaimer, the term of this patent is extended or adjusted under 35 U.S.C. 154(b) by 94 days.

(21) Appl. No.: 09/903,151

(22) Filed: Jul. 11, 2001

(65) Prior Publication Data

US 2002/0012201 A1 Jan. 31, 2002

Related U.S. Application Data

(60) Provisional application No. 60/217,670, filed on Jul. 11, 2000.

(51) Int. Cl.[7] ............................................... G11B 5/596
(52) U.S. Cl. .................... 360/245.9; 360/244.2
(58) Field of Search .......................... 360/244.2, 244.3, 360/244.1, 245.9

(56) References Cited

U.S. PATENT DOCUMENTS

| | | | |
|---|---|---|---|
| 3,812,535 A | * 5/1974 | Higgins et al. | 360/244.2 |
| 5,003,420 A | * 3/1991 | Hinlein | 360/244.2 |
| 5,027,239 A | * 6/1991 | Hagen | 360/244.2 |
| 5,694,270 A | 12/1997 | Sone et al. | |
| 5,901,017 A | 5/1999 | Sano et al. | |
| 5,966,269 A | * 10/1999 | Marek et al. | 360/244.3 |
| 5,991,122 A | * 11/1999 | Tangren et al. | 360/244.2 |
| 6,134,075 A | * 10/2000 | Bennin et al. | 360/245.9 |
| 6,362,936 B2 | * 3/2002 | Inoue et al. | 360/244.2 |
| 6,483,669 B1 | * 11/2002 | Krinke | 360/244.1 |

* cited by examiner

*Primary Examiner*—Robert S. Tupper
(74) *Attorney, Agent, or Firm*—Merchant & Gould P.C.

(57) ABSTRACT

An apparatus for supporting a recording/reading head and assembling a flex circuit in a disc drive preferably includes a suspension having a first end and a second end, and a stiffener coupled to the suspension at the second end, the stiffener extending substantially in parallel with the suspension. The apparatus further includes a flex circuit having a first portion and a second portion, the first portion is coupled to the suspension, and the second portion is coupled to the stiffener. The stiffener extends along the flex circuit. This allows one to readily locate the flex circuit in a subsequent process, such as a disc drive stack build process, so that the fabrication of the disc drive can be highly automated.

19 Claims, 6 Drawing Sheets

APPARATUS FOR SUPPORTING A RECORDING/READING HEAD AND ASSEMBLING A FLEX CIRCUIT IN A DISC DRIVE

RELATED APPLICATIONS

This application claims priority of U.S. provisional application Serial No. 60/217,640, filed Jul. 11, 2000.

FIELD OF THE INVENTION

This application relates generally to disc drives and recording/reading head interconnects and more particularly to an apparatus for supporting a recording/reading head and assembling a flex circuit in a disc drive.

BACKGROUND OF THE INVENTION

In a disc drive, a suspension is used to support/suspend a recording/reading head, and an interconnect circuit is used to electrically connect the recording/reading head to disc drive electronics which are disposed away from the recording/reading head.

In general, interconnect circuits fall into three categories, namely: wires, a flex circuit, and integral interconnects. Wire type of interconnect circuits use electrical wires to connect the head to the disc drive electronics. This wire type of interconnect circuits is seldom used any more.

Integral type of interconnect circuits, such as Trace Suspension Assembly (TSA) or Circuit Integrated Suspension (CIS), are fabricated along with a suspension gimbal and are generally a laminate of steel (the gimbal material), polymer (electrical insulator), and copper leads (electrical connection). Integral type of interconnect circuits usually extend from the head, along the suspension, along an actuator arm, and onto a disc drive electronics board where the disc drive electronics are located. Because the copper leads run the entire length of the suspension, the steel backing of the laminate also runs the entire length of the suspension. Such structure may be expensive to manufacture. In addition, the steel material has a relatively stiff structure which keeps the interconnect circuits sensibly in the plane of the suspension during manufacturing because the stiffness and the resulting ability to locate the circuit elements may be an advantage in the manufacturing process.

Flex circuit type of interconnect circuits are a separately fabricated printed circuit that is subsequently assembled to the suspension, e.g. by an adhesive material. The flex circuit is relatively less expensive and easier to manufacture than the integral types of interconnect circuits. In general, a flex circuit is mated to a finished suspension. The flex circuit is quite flexible along its entire length. The head portion of the flex circuit is attached to the suspension. However, the tail portion of the flex circuit is generally not attached to the suspension and hangs freely. FIG. 1 shows a prior art suspension 114 with a flex circuit 110 in a disc drive, wherein the flex circuit 110 is flexible along its entire length. A head portion 112 of the flex circuit 110 is attached to the suspension 114 preferably by a bonding material such as an adhesive material. A tail portion 118 of the flex circuit 110 is flexible and hangs freely. In a subsequent process, usually where the disc drive stack is built, the flexible tail portion 118 has to be manually located and routed to the disc drive electronics. As a result, the assembly of this type of interconnect circuit in a disc drive is difficult to fully automate.

Accordingly, there is a need for a suspension that allows a flex circuit to be assembled in the disc drive in a fully automated fashion.

SUMMARY OF THE INVENTION

Against this backdrop the present invention has been developed. The present invention provides a suspension with a stiffener in a disc drive to provide support to a flex circuit, particularly at the tail portion of the flex circuit. The stiffener can be formed in a variety of ways.

In one embodiment of the present invention, an apparatus for a disc drive preferably includes a suspension having a first end and a second end, and a stiffener coupled to the suspension at the second end, the stiffener extending substantially in parallel with the suspension.

The apparatus preferably includes a flex circuit having a first portion and a second portion. The first portion is attached to the suspension, and the second portion is attached to the stiffener. The stiffener extends along the flex circuit.

In a further embodiment, the stiffener is welded to the suspension. Alternatively, the stiffener is integral with the suspension.

In a further embodiment, the stiffener extends towards the second portion of the flex circuit. Alternatively, the stiffener is bent to extend distally from the second end of the suspension.

The suspension preferably includes a load beam. The stiffener is coupled to the load beam.

The present invention also provides a method of fabricating an apparatus for supporting a recording/reading head and assembling a flex circuit in a disc drive. The method includes steps of providing a suspension, and providing a stiffener. The stiffener is coupled to the suspension.

The method preferably includes steps of etching the suspension and the stiffener out of a panel, and orientating the stiffener such that the stiffener extends along the flex circuit. The stiffener is integral with the suspension.

The method preferably includes steps of attaching a first portion of the flex circuit to the suspension, and attaching a second portion of the flex circuit to the stiffener.

In a further embodiment, the step of etching includes a step of etching the suspension and the stiffener out of a carrier strip that is capable of providing a plurality of suspensions and a plurality of stiffeners. The step of orientating the stiffener includes a step of bending the stiffener backwards.

In another embodiment of the present invention, the method preferably includes steps of providing a panel, etching a suspension out of the panel, and attaching a stiffener to the suspension. The step of attaching the stiffener to the suspension preferably includes a step of welding the stiffener to the suspension.

One of the advantages of the present invention is that the stiffener provides support to the flex circuit, particularly at the tail portion of the flex circuit, thereby allowing one to readily locate the flex circuit in the subsequent process, such as a disc drive stack build process. Accordingly, the fabrication of the disc drive can be highly automated.

These and various other features as well as advantages which characterize the present invention will be apparent from a reading of the following detailed description and a review of the associated drawings.

DETAILED DESCRIPTION

The preferred embodiments of the present invention provide a suspension with a stiffener in a disc drive to provide support to a flex circuit and a method of fabricating a suspension with a stiffener. A first portion or a head portion of the flex circuit is coupled to the suspension, and a second portion or a tail portion of the flex circuit is coupled to the stiffener. The stiffener extends along the flex circuit. This allows one to readily locate the flex circuit, particularly the tail portion of the flex circuit, in a subsequent process, such as when a disc drive stack is built, so that the fabrication of the disc drive can be automated. The stiffener can be formed in a variety of ways which will be discussed later in detail.

Figure 1:
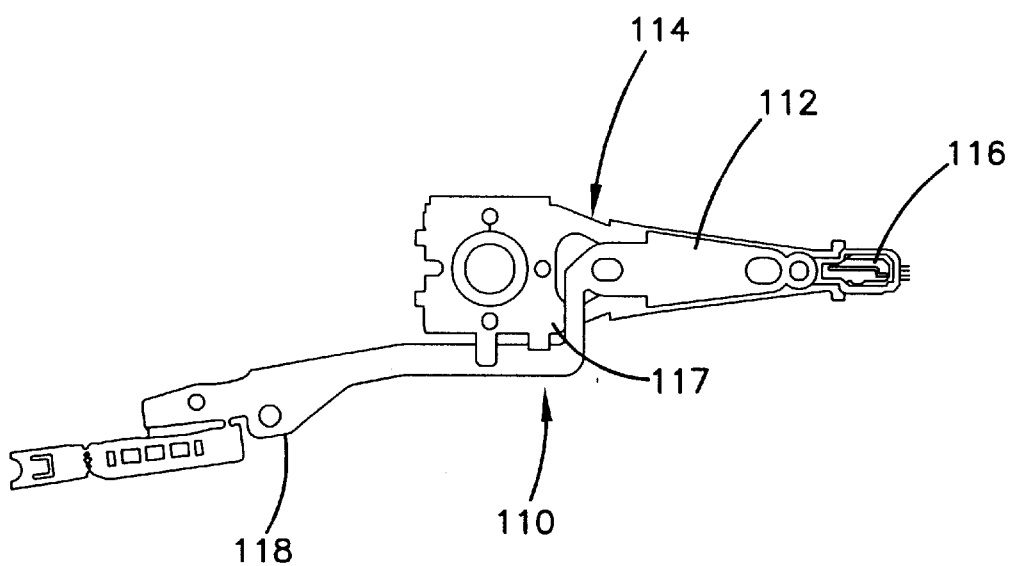
FIG. 1 is a top view of a prior art suspension attached with a flex circuit in a disc drive.

As described above, FIG. 1 shows a prior art suspension 114 used in a disc drive with a flex circuit 110. A head portion 112 of the flex circuit 110 is coupled to the suspension 114 preferably by a bonding material such as an adhesive material. A tail portion 118 of the flex circuit 110 hangs freely from the suspension 114. In a subsequent process such as when a disc drive stack is built, the flexible tail portion 118 has to be manually located and routed so that it can be coupled to the disc drive electronics. As a result, the assembly of the flex circuit 110 in a disc drive may not be fully automated.

Figure 2:
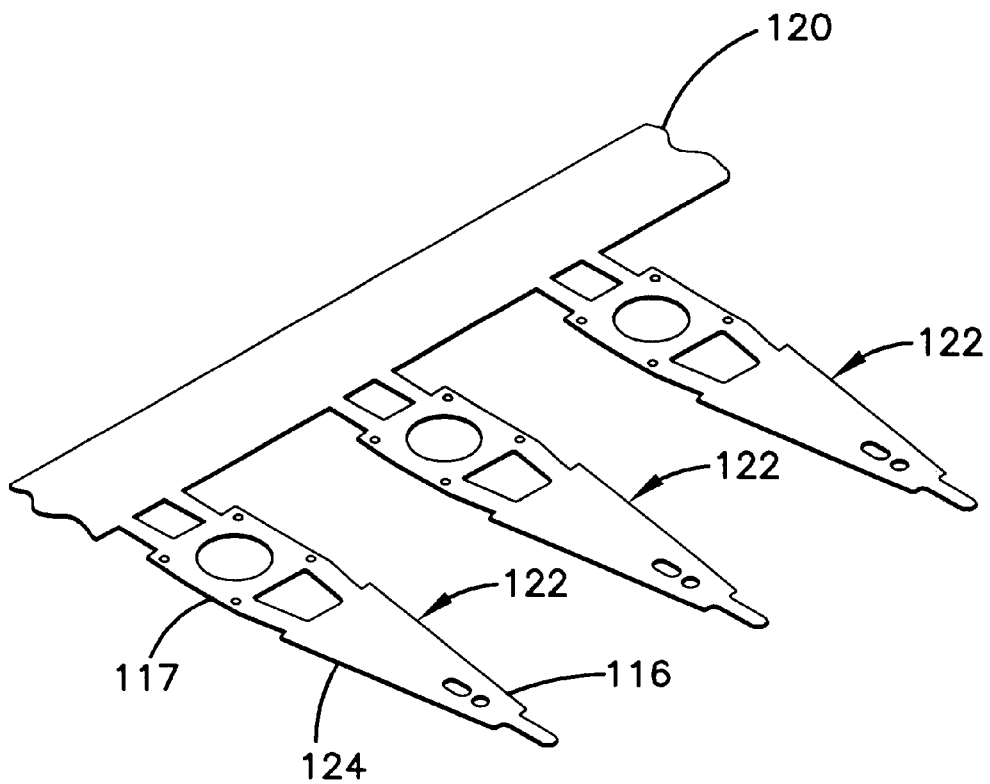
FIG. 2 is a schematic view of a carrier strip forming a plurality of suspensions according to the prior art.

FIG. 2 is a schematic view of a carrier strip forming a plurality of suspensions according to the prior art. Three suspensions 122 are shown still attached to the carrier strip 120. The parts of the suspensions 122 are shown after they have been etched out of a panel. Each of the suspensions 122 includes a load beam 124, a base plate (not shown), and a gimbal (not shown). Each suspension 122 has a first end 116 and a second end 117.

Figure 3:
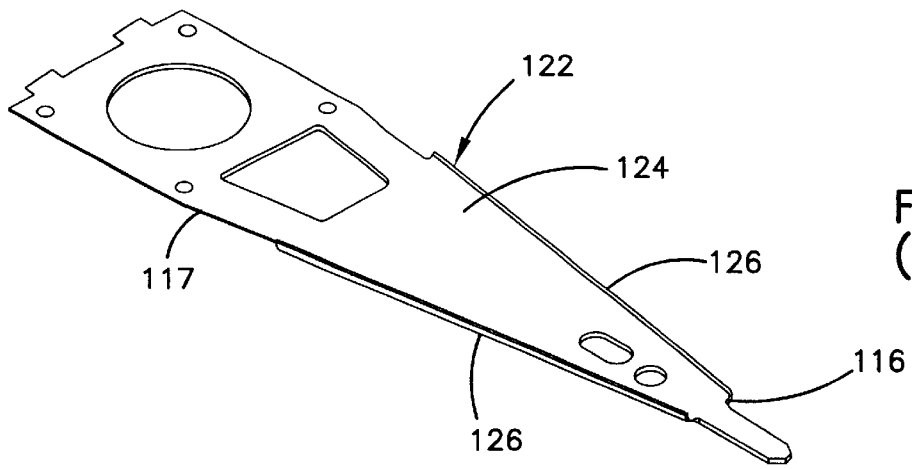
FIG. 3 is a schematic view of a prior art single suspension after a load beam has been formed.

FIG. 3 shows a prior art single suspension 122 after the suspension 122 has been formed, for example, rails 126 of the load beam 124 are bent, etc., and the suspension 122 is detached from the carrier strip 120.

Figure 4:
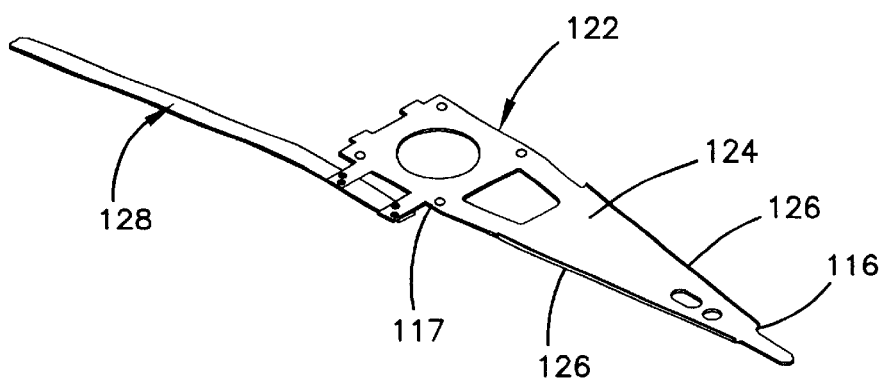
FIG. 4 is a schematic view of a single suspension with a stiffener according to the preferred embodiments of the present invention.

FIG. 4 is a schematic view of a suspension according to the preferred embodiments of the present invention. The suspension 122 includes a stiffener 128 coupled to the load beam 124. In the preferred embodiments, the stiffener 128 is made of the same material as the suspension 122. Alternatively, other materials may be used. In the preferred embodiments, the stiffener 128 is welded to the suspension 122. The stiffener 128 extends distally from the suspension 122 and is generally parallel with the suspension 122. Accordingly, the head portion 112 of the flex circuit 110 is coupled to the suspension 122, and the tail portion 118 of the flex circuit 110 is coupled to the stiffener 128 (see FIG. 8).

Figure 5:
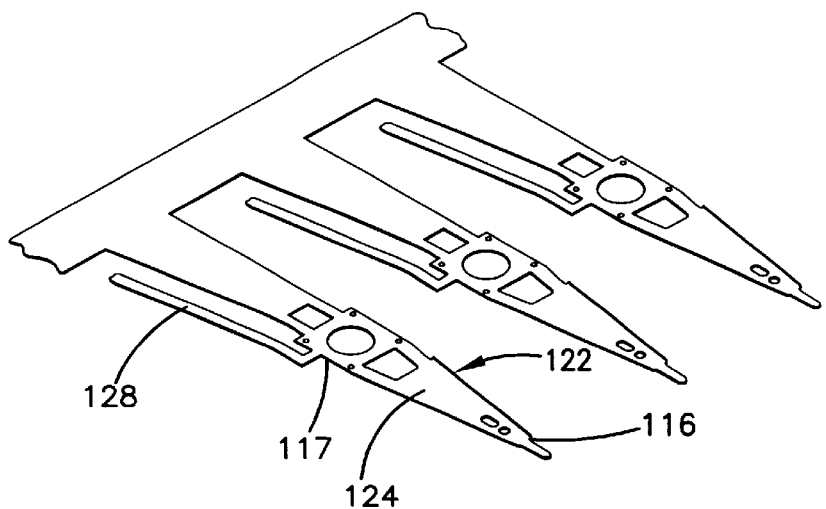
FIG. 5 is a schematic view of a carrier strip forming a plurality of suspensions with stiffeners according to the preferred embodiments of the present invention.
Figure 6:
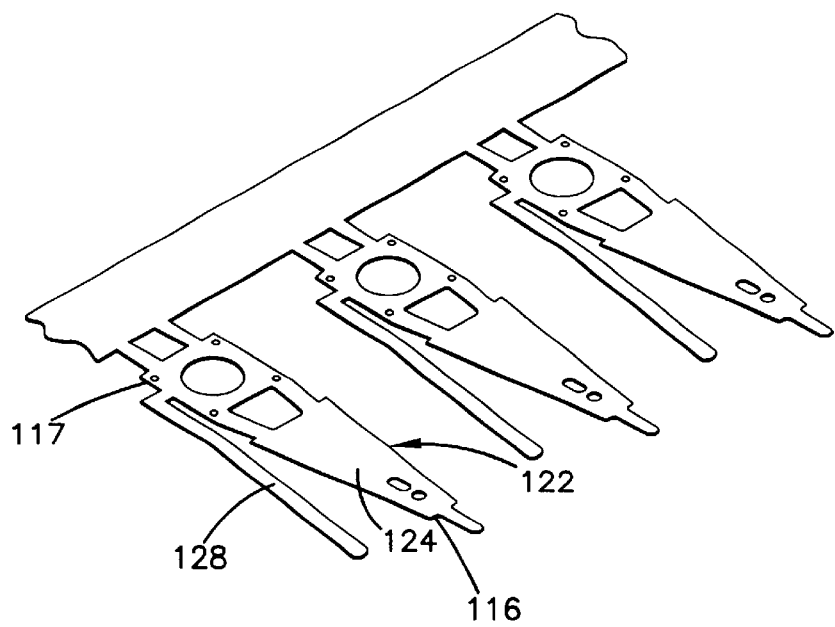
FIG. 6 is a schematic view of a carrier strip forming a plurality of suspensions with stiffeners according to another preferred embodiment of the present invention.
Figure 7:
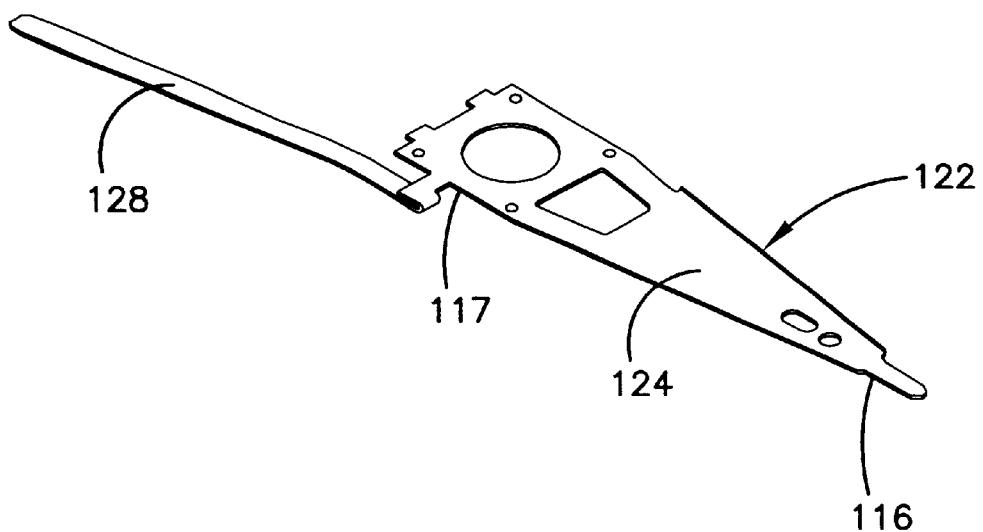
FIG. 7 is a schematic view of a single suspension, which is detached from the carrier strip as shown in FIG. 6, with a stiffener orientated backwards according to another preferred embodiment of the present invention.

The stiffener 128 can be coupled to the load beam 124 in other ways without departing from the scope of the present invention. For example, it may be glued, mechanically clamped, etc. Alternatively, the stiffener 128 can be made integrally with the load beam 124. In FIG. 5, the stiffener 128 extends distally from the suspension 122 as seen in FIGS. 5–7. In FIG. 6, the stiffener 128 extends alongside the suspension 122. It is then bent as shown in FIG. 7 so that it extends distally from the suspension 122. As can be seen by comparing FIGS. 5 and 6, the size of the panel needed to form the suspension 122 of FIG. 5 is much larger than the size of the panel needed in FIG. 6.

The stiffener 128 can alternatively be coupled to other locations of the disc drive, for example, it may be coupled to a base plate (not shown) of the disc drive. The base plate is connected to the load beam 124 to support the suspension 122.

In fabrication, a plurality of suspensions 122 and stiffeners 128 are etched out of a panel in the same process. Alternatively, the suspensions 122 can be etched out of a panel, and the stiffeners 128 formed separately and later welded onto the suspensions 122.

As shown in FIGS. 4–7, the stiffener 128 may be configured or arranged in a flat or substantially flat structure. It will be appreciated that the stiffener can be configured or arranged in any suitable structure. For example, the cross section of the stiffener can be in a U shape, or a V shape, etc. The stiffener with a U-shape or V-shape structure is generally stiffer than the stiffener with a flat structure.

Figure 8:
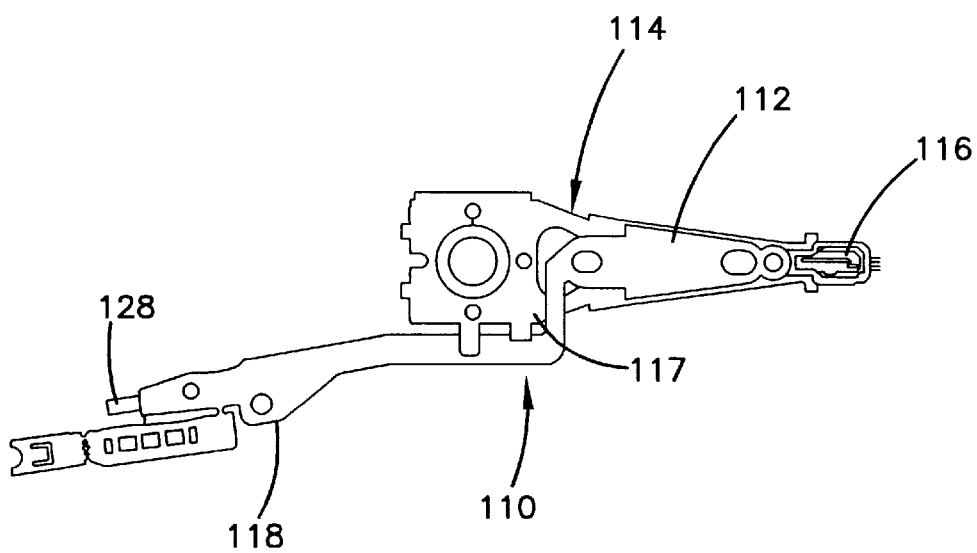
FIG. 8 is a top view of a suspension according to the preferred embodiments of the present invention having a flex circuit disposed thereon.

As shown in FIG. 8, a flex circuit 110 is coupled to a suspension 122 and stiffener 128 preferably using a bonding material such as adhesive material, where the head portion 112 of the flex circuit 110 is coupled to the suspension 122, and the tail portion 118 of the flex circuit 110 is coupled to the stiffener 128. As shown in FIG. 8, the tail portion 118 of the flex circuit 110 no longer hangs as it did with the prior art suspension because it is now supported by the stiffener 128. This allows the suspension and flex circuit to be handled by automated machinery for subsequent processing.

It will be clear that the present invention is well adapted to attain the ends and advantages mentioned as well as those inherent therein. While presently preferred embodiments have been described for purposes of this disclosure, various changes and modifications may be made which are well within the scope of the present invention. For example, the exemplary stiffener could be extended in other directions if desired. Numerous other changes may be made which will readily suggest themselves to those skilled in the art and which are encompassed in the spirit of the invention disclosed and as defined in the appended claims.

What is claimed is:

1. An apparatus for a disc drive, comprising:
    a suspension having a first end and a second end;
    a stiffener coupled to the suspension at the second end, the stiffener extending distally from the suspension and substantially in parallel with the suspension; and
    a flex circuit supported by the stiffener.

2. The apparatus of claim 1, wherein the flex circuit includes a first portion and a second portion, the first portion being coupled to the suspension, and the second portion being coupled to the stiffener, the stiffener extending along the flex circuit.

3. The apparatus of claim 1, wherein the stiffener is welded to the suspension.

4. The apparatus of claim 1, wherein the stiffener is integral with the suspension.

5. The apparatus of claim 2, wherein the stiffener extends towards the second portion of the flex circuit.

6. The apparatus of claim 1, wherein the suspension comprises a load beam.

7. The apparatus of claim 6, wherein the stiffener is coupled to the load beam.

8. The flex circuit assembly in a disc drive including a flex circuit having a first portion and a second portion, comprising:

a suspension, the first portion of the flex circuit being coupled to the suspension; and means for stiffening the second portion of the flex circuit, the second portion of the flex circuit extending distally from the suspension.

9. The assembly of claim 8 wherein the means for stiffening comprises a stiffener that extends along the flex circuit.

10. The assembly of claim 9 wherein the stiffener is welded to the suspension.

11. The assembly of claim 9 wherein the stiffener is integral with the suspension.

12. The assembly of claim 9, wherein the stiffener is bent to extend distally from the second end of the suspension.

13. The assembly of claim 9, wherein the suspension comprises a load beam, and the stiffener is coupled to the load beam.

14. An apparatus for a disc drive, comprising:

a suspension having first and second ends;

a flex circuit having first and second portions, the first portion of the flex circuit being coupled to the suspension and the second portion extending distally from the suspension; and a stiffener coupled to the second end of the suspension and coupled to and extending along the second portion of the flex circuit.

15. The apparatus of claim 14 wherein the stiffener extends substantially in parallel with the suspension.

16. The apparatus of claim 14 wherein the stiffener is capable of being bent to extend distally from the second end of the suspension.

17. The assembly of claim 14 wherein the stiffener is welded to the suspension.

18. The assembly of claim 14 wherein the stiffener is integral with the suspension.

19. The assembly of claim 14 wherein the stiffener is secured to the suspension with an adhesive.

* * * * *

UNITED STATES PATENT AND TRADEMARK OFFICE
CERTIFICATE OF CORRECTION

PATENT NO.    : 6,671,130 B2
DATED         : December 30, 2003
INVENTOR(S)   : Berg et al.

It is certified that error appears in the above-identified patent and that said Letters Patent is hereby corrected as shown below:

Title page,
Item [60], Related U.S. Application Data, "Provisional application No. 60/217,670, filed Jul. 11, 2000." should read -- Provisional application No. 60/217,640, filed Jul. 11, 2000. --

Column 5,
Line 9, "The flex circuit" should read -- A flex circuit --

Signed and Sealed this

Twenty-fifth Day of May, 2004

JON W. DUDAS
*Acting Director of the United States Patent and Trademark Office*